(12) United States Patent
Murai et al.

(10) Patent No.: US 7,139,248 B2
(45) Date of Patent: Nov. 21, 2006

(54) ELECTRONIC CONFERENCE SYSTEM USING PRESENTATION DATA PROCESSING BASED ON AUDIENCE EQUIPMENT INFORMATION

(75) Inventors: Shinya Murai, Kanagawa (JP); Fumiko Tanaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 864 days.

(21) Appl. No.: 10/058,081

(22) Filed: Jan. 29, 2002

(65) Prior Publication Data

US 2002/0101829 A1    Aug. 1, 2002

(30) Foreign Application Priority Data

Jan. 29, 2001    (JP)    ............................. 2001-020024

(51) Int. Cl.
*H04L 12/16*    (2006.01)
*H04M 3/04*    (2006.01)

(52) U.S. Cl. ................. 370/260; 370/412; 379/202.01; 709/209

(58) Field of Classification Search ................. 370/260, 370/263, 395.71, 395.72, 401, 412, 467, 370/262, 390, 269; 345/620, 733, 740; 379/202.01; 725/87–92; 709/209
See application file for complete search history.

(56) References Cited

U.S. PATENT DOCUMENTS 5,452,299 A * 9/1995 Thessin et al. ............. 370/260
6,044,081 A * 3/2000 Bell et al. .................... 370/401
6,111,570 A * 8/2000 Sugikawa et al. .......... 715/748
6,437,786 B1 * 8/2002 Yasukawa .................... 345/474

FOREIGN PATENT DOCUMENTS

| JP | 5-134947 | 6/1993 |
| JP | 5-216800 | 8/1993 |
| JP | 10-027161 | 1/1998 |
| JP | 10-124430 | 5/1998 |
| JP | 10-171731 | 6/1998 |
| JP | 10-301863 | 11/1998 |
| JP | 10-326244 | 12/1998 |
| JP | 11-017677 | * 1/1999 |
| JP | 2000-172609 | 6/2000 |
| JP | 2000-347968 | 12/2000 |

* cited by examiner

*Primary Examiner*—Afsar Qureshi
(74) *Attorney, Agent, or Firm*—Oblon, Spivak, McClelland, Maier & Neustadt, P.C.

(57) ABSTRACT

In an electronic conference system, a speaker's equipment acquires information regarding the audience's equipment from the audience's equipment, produces presentation data for transmission suitable for the audience's equipment, by applying a prescribed processing to the presentation data according to the information regarding the audience's equipment, and transmits the presentation data for transmission to the audience's equipment, such that the presentation data can be displayed correctly even at the audience's equipments which have display capabilities different from that of the speaker's equipment.

18 Claims, 8 Drawing Sheets

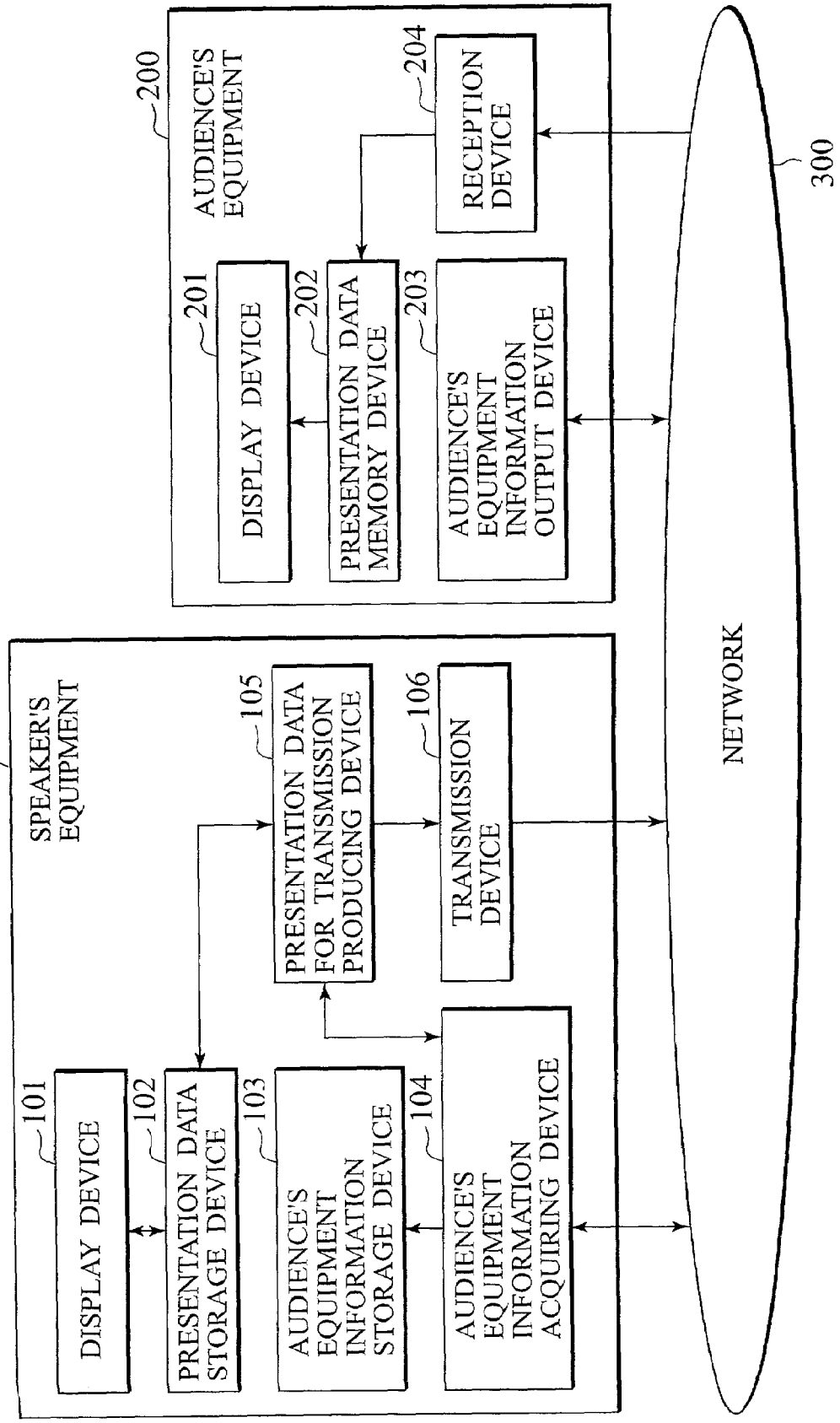

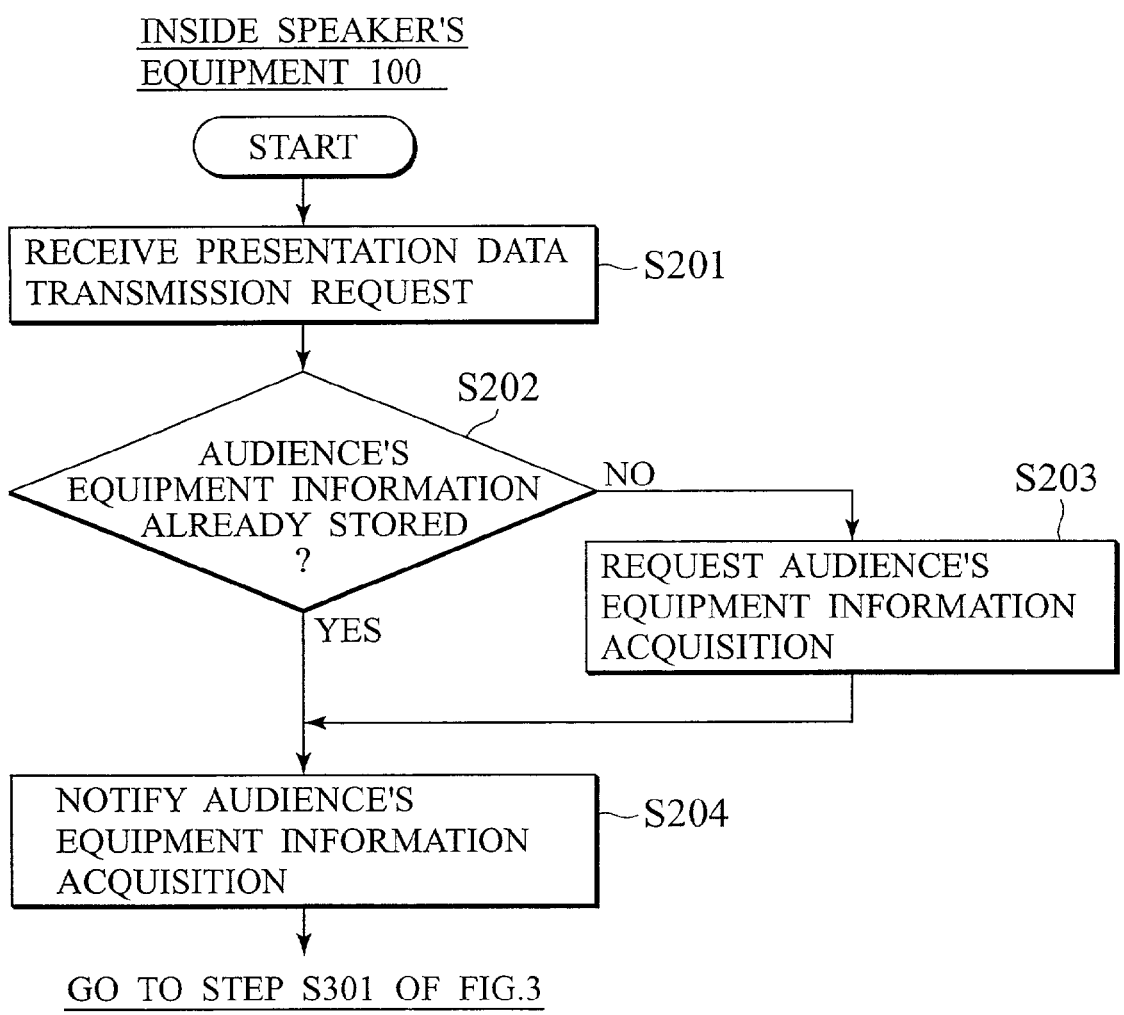

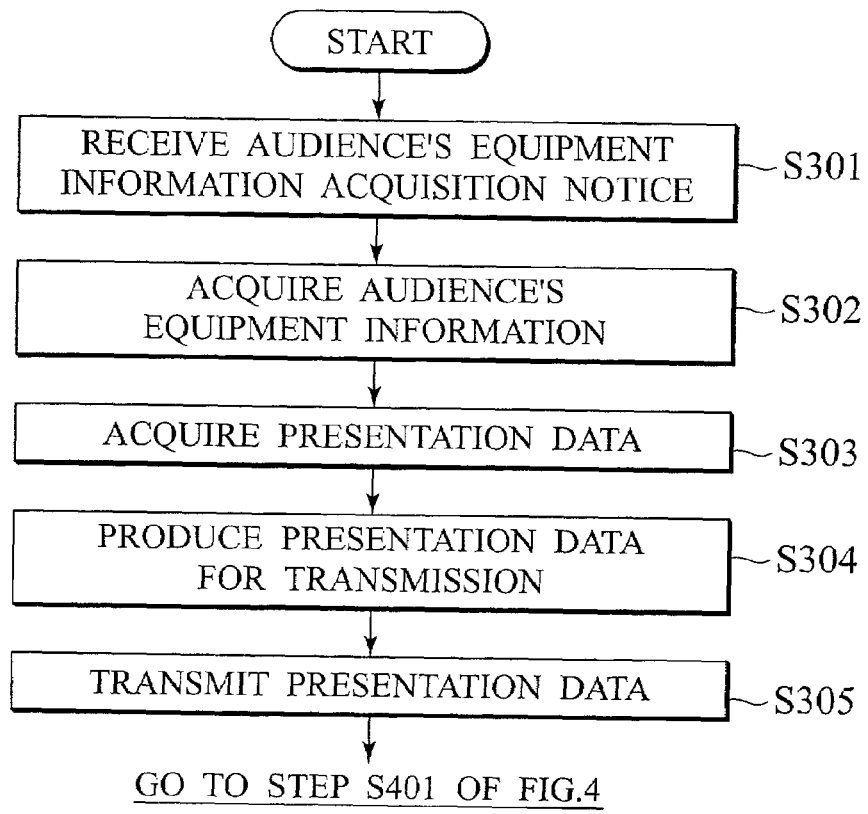
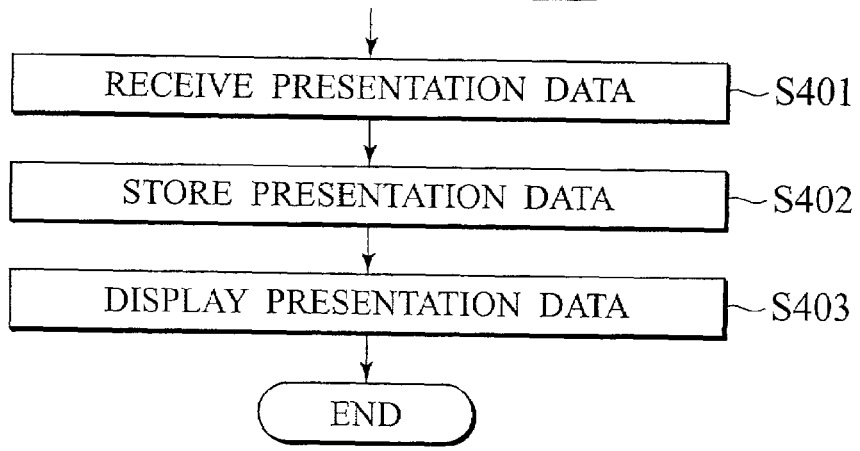

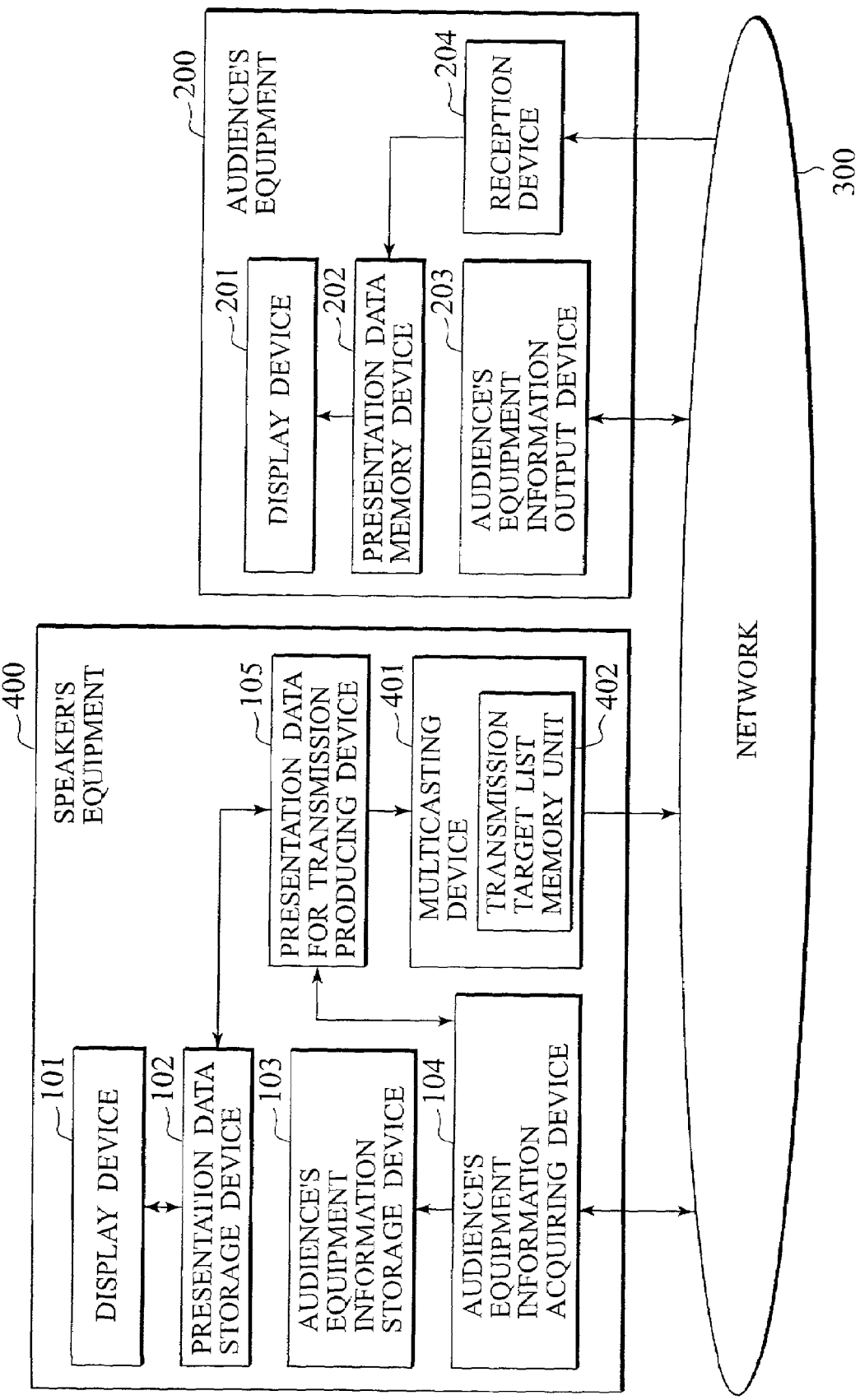

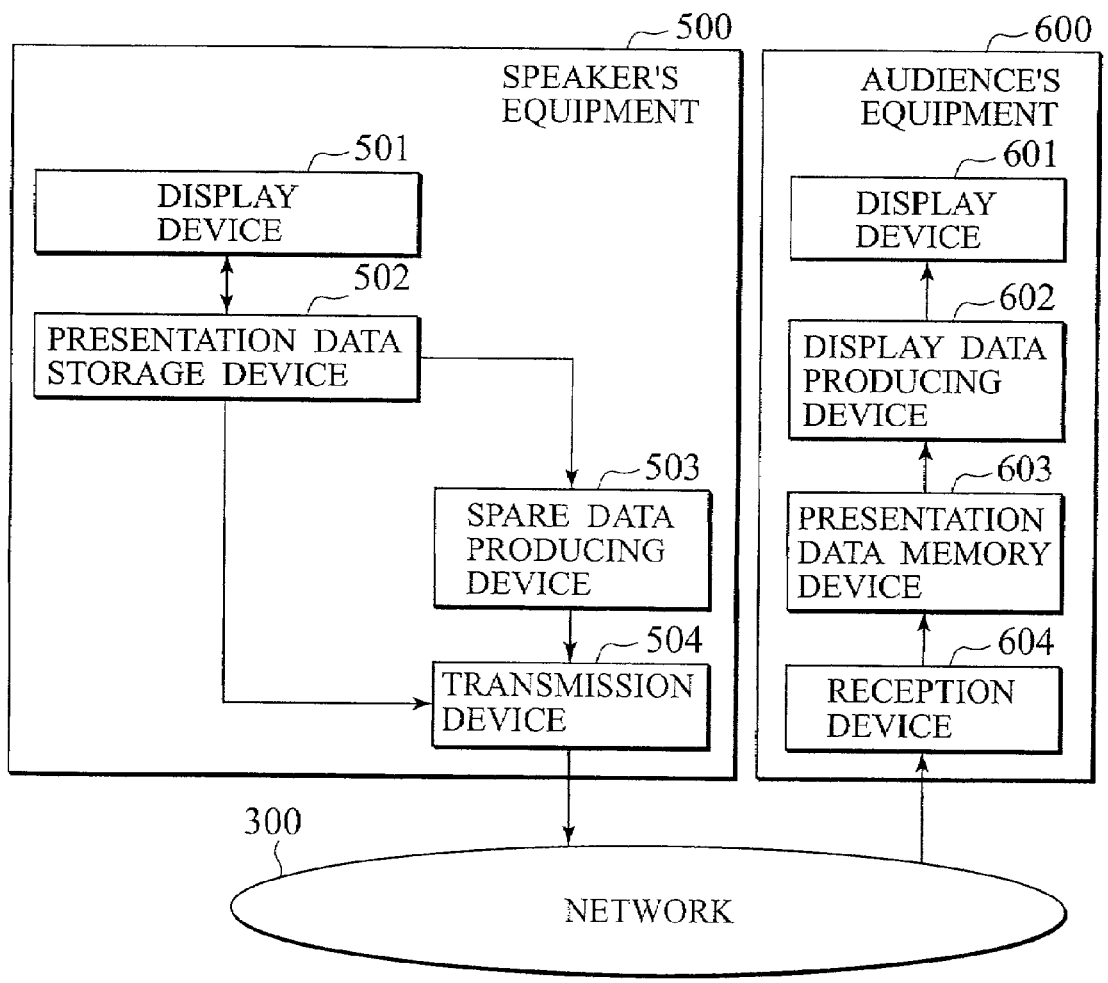

FIG.9A  PRESENTATION DATA

| 1 | CHARACTER INFORMATION | FONT INFORMATION | POSITION INFORMATION | ATTRIBUTE INFORMATION |
|---|---|---|---|---|
| 2 | CHARACTER INFORMATION | FONT INFORMATION | POSITION INFORMATION | ATTRIBUTE INFORMATION |
| 3 | IMAGE INFORMATION | | POSITION INFORMATION | |
| 4 | CHARACTER INFORMATION | FONT INFORMATION | POSITION INFORMATION | ATTRIBUTE INFORMATION |
| 5 | IMAGE INFORMATION | | POSITION INFORMATION | |

⋮

FIG.9B  SPARE DATA

| 1 | SPARE IMAGE INFORMATION | POSITION INFORMATION |
|---|---|---|
| 2 | SPARE IMAGE INFORMATION | POSITION INFORMATION |
| 3 | SPARE IMAGE INFORMATION | POSITION INFORMATION |

⋮

FIG.9C  DISPLAY DATA

| 1 | CHARACTER INFORMATION | FONT INFORMATION | POSITION INFORMATION | ATTRIBUTE INFORMATION |
|---|---|---|---|---|
| 2 | SPARE IMAGE INFORMATION | | POSITION INFORMATION | |
| 3 | IMAGE INFORMATION | | POSITION INFORMATION | |
| 4 | SPARE IMAGE INFORMATION | | POSITION INFORMATION | |
| 5 | IMAGE INFORMATION | | POSITION INFORMATION | |

⋮

ELECTRONIC CONFERENCE SYSTEM USING PRESENTATION DATA PROCESSING BASED ON AUDIENCE EQUIPMENT INFORMATION

BACKGROUND OF THE INVENTION

1. Field of the Invention

The present invention relates to an electronic conference system capable of displaying presentation data in synchronization at a plurality of information processing equipments connected through a network.

2. Description of the Related Art

As an electronic conference system capable of supporting the presentation utilizing a network, there is a presentation conference function of the Microsoft PowerPoint 97 developed by the Microsoft Corporation. In this system, when a communication link between an information processing equipment utilized by a speaker (which will be referred to as a "speaker's equipment" hereafter) and information processing equipments utilized by the audience (which will be referred to as "audience's equipments" hereafter) is established, the presentation data are distributed from the speaker's equipment to each audience's equipment and a first page slide of the presentation data is displayed at each audience's equipment. Thereafter, when the speaker changes slides by using the speaker's equipment, a new slide is displayed at each audience's equipment.

By using this presentation conference function, it is possible to display the presentation data in synchronization among a plurality of information processing equipments connected through a network.

However, in this system, there has been a problem that the presentation data cannot be displayed correctly at the audience's equipments when the display capabilities of the speaker's equipment and the audience's equipments are different. For example, such a problem arises when the audience's equipments are not provided with fonts for characters contained in the presentation data.

BRIEF SUMMARY OF THE INVENTION

It is therefore an object of the present invention to provide an electronic conference system in which the presentation data can be displayed correctly at the audience's equipments which have display capabilities different from that of the speaker's equipment.

In short, the present invention achieves this object by acquiring information regarding display capabilities of the audience's equipments at the speaker's equipment and producing data that can be displayed correctly by the audience's equipments according to that information.

According to one aspect of the present invention there is provided an electronic conference system, comprising: a first information processing equipment to be used by a speaker of a presentation to be presented to audience; a second information processing equipment to be used by the audience; and a network connecting the first information processing equipment and the second information processing equipment; the first information processing equipment having: a storage device configured to store presentation data prepared by the speaker; an information acquisition device configured to acquire information regarding the second information processing equipment from the second information processing equipment; a producing device configured to produce presentation data for transmission suitable for the second information processing equipment, by applying a prescribed processing to the presentation data stored in the storage device, according to the information regarding the second information processing equipment acquired by the information acquisition device; and a transmission device configured to transmit the presentation data for transmission produced by the producing device, to the second information processing equipment; and the second information processing equipment having: an information output device configured to output the information regarding the second information processing equipment in response to a request from the first information processing equipment; a reception device configured to receive the presentation data for transmission transmitted from the first information processing equipment; and a display device configured to display the presentation data for transmission received by the reception device.

According to another aspect of the present invention there is provided a speaker's information processing equipment to be used by a speaker of a presentation to be presented to audience using an audience's information processing equipment connected to the speaker's information processing equipment through a network, the speaker's information processing equipment comprising: a storage device configured to store presentation data prepared by the speaker; an information acquisition device configured to acquire information regarding the audience's information processing equipment from the audience's information processing equipment; a producing device configured to produce presentation data for transmission suitable for the audience's information processing equipment, by applying a prescribed processing to the presentation data stored in the storage device, according to the information regarding the audience's information processing equipment acquired by the information acquisition device; and a transmission device configured to transmit the presentation data for transmission produced by the producing device, to the audience's information processing equipment.

According to another aspect of the present invention there is provided a computer program product for causing a computer to function as a speaker's information processing equipment to be used by a speaker of a presentation to be presented to audience using an audience's information processing equipment connected to the speaker's information processing equipment through a network, the computer program product comprising: a first computer program code for causing the computer to store presentation data prepared by the speaker in a storage device; a second computer program code for causing the computer to acquire information regarding the audience's information processing equipment from the audience's information processing equipment; a third computer program code for causing the computer to produce presentation data for transmission suitable for the audience's information processing equipment, by applying a prescribed processing to the presentation data stored in the storage device, according to the information regarding the audience's information processing equipment acquired by the second computer program code; and a fourth computer program code for causing the computer to transmit the presentation data for transmission produced by the third computer program code, to the audience's information processing equipment.

According to another aspect of the present invention there is provided an electronic conference system, comprising: a first information processing equipment to be used by a speaker of a presentation to be presented to audience; a plurality of second information processing equipments to be used by the audience; and a network connecting the first information processing equipment and the second information processing equipments; the first information processing equipment having: a storage device configured to store presentation data prepared by the speaker; an information acquisition device configured to acquire information regarding each second information processing equipment from each second information processing equipment; a producing device configured to produce a plurality of presentation data for transmission suitable for the second information processing equipments respectively, by applying a prescribed processing to the presentation data stored in the storage device, according to the information regarding each second information processing equipment acquired by the information acquisition device; and a multicasting device configured to produce a transmission target list indicating each group of those second information processing equipments to which identical presentation data for transmission are to be transmitted, and multicast the presentation data for transmission to the second information processing equipments according to the transmission target list; and each second information processing equipment having: an information output device configured to output the information regarding each second information processing equipment in response to a request from the first information processing equipment; a reception device configured to receive the presentation data for transmission transmitted from the first information processing equipment; and a display device configured to display the presentation data for transmission received by the reception device.

According to another aspect of the present invention there is provided a speaker's information processing equipment to be used by a speaker of a presentation to be presented to audience using a plurality of audience's information processing equipments connected to the speaker's information processing equipment through a network, the speaker's information processing equipment comprising: a storage device configured to store presentation data prepared by the speaker; an information acquisition device configured to acquire information regarding each audience's information processing equipment from each audience's information processing equipment; a producing device configured to produce a plurality of presentation data for transmission suitable for the audience's information processing equipments respectively, by applying a prescribed processing to the presentation data stored in the storage device, according to the information regarding each audience's information processing equipment acquired by the information acquisition device; and a multicasting device configured to produce a transmission target list indicating each group of those audience's information processing equipments to which identical presentation data for transmission are to be transmitted, and multicast the presentation data for transmission to the audience's information processing equipments according to the transmission target list.

According to another aspect of the present invention there is provided a computer program product for causing a computer to function as a speaker's information processing equipment to be used by a speaker of a presentation to be presented to audience using a plurality of audience's information processing equipments connected to the speaker's information processing equipment through a network, the computer program product comprising: a first computer program code for causing the computer to store presentation data prepared by the speaker in a storage device; a second computer program code for causing the computer to acquire information regarding each audience's information processing equipment from each audience's information processing equipment; a third computer program code for causing the computer to produce a plurality of presentation data for transmission suitable for the audience's information processing equipments respectively, by applying a prescribed processing to the presentation data stored in the storage device, according to the information regarding each audience's information processing equipment acquired by the second computer program code; and a fourth computer program code for causing the computer to produce a transmission target list indicating each group of those audience's information processing equipments to which identical presentation data for transmission are to be transmitted, and multicast the presentation data for transmission to the audience's information processing equipments according to the transmission target list.

According to another aspect of the present invention there is provided an electronic conference system, comprising: a first information processing equipment to be used by a speaker of a presentation to be presented to audience; a second information processing equipment to be used by the audience; and a network connecting the first information processing equipment and the second information processing equipment; the first information processing equipment having: a storage device configured to store presentation data prepared by the speaker; a spare data producing device configured to produce spare data corresponding to at least a part of the presentation data stored in the storage device by converting an original data format of the at least a part of the presentation data into a different data format; and a transmission device configured to transmit the spare data produced by the spare data producing device and the presentation data containing original data corresponding to the spare data, to the second information processing equipment; and the second information processing equipment having: a reception device configured to receive the spare data and the presentation data transmitted from the first information processing equipment; a display data producing device configured to produce display data in a data format displayable by the second information processing equipment from the spare data and the presentation data received by the reception device, by using one of the spare data and the original data that are displayable by the second information processing equipment; and a display device configured to display the display data produced by the display data producing device.

According to another aspect of the present invention there is provided an audience's information processing equipment to be used by audience of a presentation to be presented by a speaker using a speaker's information processing equipment connected to the audience's information processing equipment through a network, the audience's information processing equipment comprising: a reception device configured to receive spare data corresponding to at least a part of presentation data prepared by the speaker and the presentation data containing original data corresponding to the spare data, which are transmitted from the speaker's information processing equipment, the spare data being obtained by converting an original data format of the at least a part of the presentation data into a different data format; a display data producing device configured to produce display data in a data format displayable by the audience's information processing equipment from the spare data and the presentation data received by the reception device, by using one of the spare data and the original data that are displayable by the audience's information processing equipment; and a display device configured to display the display data produced by the display data producing device.

According to another aspect of the present invention there is provided a computer program product for causing a computer to function as an audience's information processing equipment to be used by audience of a presentation to be presented by a speaker using a speaker's information processing equipment connected to the audience's information processing equipment through a network, the computer program product comprising: a first computer program code for causing the computer to receive spare data corresponding to at least a part of presentation data prepared by the speaker and the presentation data containing original data corresponding to the spare data, which are transmitted from the speaker's information processing equipment, the spare data being obtained by converting an original data format of the at least a part of the presentation data into a different data format; a second computer program code for causing the computer to produce display data in a data format displayable by the audience's information processing equipment from the spare data and the presentation data received by the first computer program code, by using one of the spare data and the original data that are displayable by the audience's information processing equipment; and a third computer program code for causing the computer to display the display data produced by the second computer program code.

Other features and advantages of the present invention will become apparent from the following description taken in conjunction with the accompanying drawings.

BRIEF DESCRIPTION OF THE DRAWINGS

FIG. 1 is a block diagram showing an exemplary configuration of an electronic conference system according to the first embodiment of the present invention.

FIG. 2 is a flow chart showing a first part of a processing procedure of a presentation data distribution method in the electronic conference system of FIG. 1.

FIG. 3 is a flow chart showing a second part of a processing procedure of a presentation data distribution method in the electronic conference system of FIG. 1.

FIG. 4 is a flow chart showing a third part of a processing procedure of a presentation data distribution method in the electronic conference system of FIG. 1.

FIG. 6 is a block diagram showing an exemplary configuration of an electronic conference system according to the second embodiment of the present invention.

FIG. 7 is a diagram showing an example of audience's equipment information that can be used in a presentation data for transmission producing procedure in the electronic conference system of FIG. 6.

FIG. 8 is a block diagram showing an exemplary configuration of an electronic conference system according to the third embodiment of the present invention.

FIGS. 9A to 9C are diagrams showing examples of presentation data, spare data and display data that can be used in a display data producing procedure in the electronic conference system of FIG. 8.

DETAILED DESCRIPTION OF THE INVENTION

Figure 5B:
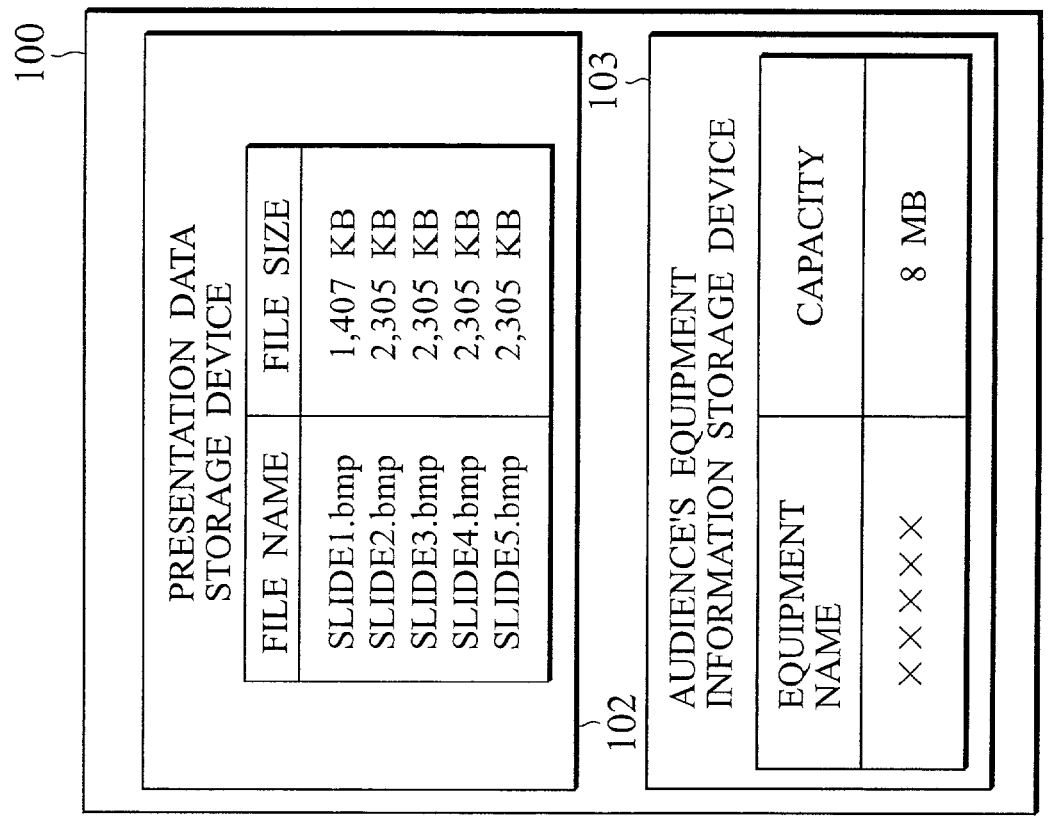
FIGS. 5A to 5D are diagrams showing four examples of audience's equipment information that can be used in a presentation data for transmission producing procedure in the electronic conference system of FIG. 1.

Referring now to FIG. 1 to FIG. 5D, the first embodiment of an electronic conference system according to FIG. 1 shows an exemplary configuration of the electronic conference system according to the first embodiment of the present invention. In FIG. 1, the electronic conference system comprises an information processing equipment (speaker's equipment) 100, an information processing equipment (audience's equipment) 200, and a network 300 connecting the information processing equipment 100 and the information processing equipment 200.

The information processing equipment (speaker's equipment) 100 is an equipment that becomes a transmitting side of the presentation data prepared by the speaker, which is to be utilized by the speaker. On the other hand, the information processing equipment (audience's equipment) 200 is an equipment that becomes a receiving side of the presentation data transmitted from the speaker's equipment 100, which is to be utilized by the audience. The speaker's equipment 100 and the audience's equipment 200 mutually transmit and receive various information including the presentation data, and these transmission and reception will be carried out through the network 300 that is formed by a wired network or a radio network.

Note that FIG. 1 shows only one audience's equipment 200 for the sake of simplicity but in practice a plurality of audience's equipments 200 to be utilized by different members of the audience may be connected to the network 300.

In addition, the speaker's equipment 100 has a display device 101, a presentation data storage device 102 for storing the presentation data prepared by the speaker, an audience's equipment information storage device 103 for storing an audience's equipment information acquired from the audience's equipment 200, an audience's equipment information acquiring device 104 for acquiring the audience's equipment information by exchanges with the audience's equipment 200, a presentation data for transmission producing device 105 for producing data to be actually transmitted to the audience's equipment 200 from the presentation data stored in the presentation data storage device 102, and a transmission device 106 for transmitting the presentation data for transmission produced by the presentation data for transmission producing device 105 to the audience's equipment 200.

On the other hand, the audience's equipment 200 has a display device 201, a presentation data memory device 202 for temporarily storing the presentation data received from the speaker's equipment 100, an audience's equipment information output device 203 for collecting information regarding a display capability of the audience's equipment 200 and outputting it as the audience's equipment information to the speaker's equipment 100, and a reception device 204 for receiving the presentation data for transmission from the speaker's equipment 100 through the network 300.

Each one of the speaker's equipment 100 and the audience's equipment 200 can be formed by a general purpose computer having a communication function with respect to the network 300 such as PC, for example. It is also possible to use a portable terminal (portable telephone, PHS (Personal Handy-phone System), etc.) or a digital home electronics equipment having a communication function. It can be provided as either a stand-alone type or a portable type.

Although not shown in FIG. 1, each one of the speaker's equipment 100 and the audience's equipment 200 also has at least input devices such as keyboard, mouse, etc., and a memory device such as hard disk device, etc., in addition to the display device 101 or 201. Then, a part of the memory device of the speaker's equipment 100 forms the presentation data storage device 102 and the audience's equipment information storage device 103, while a part of the memory device of the audience's equipment 200 forms the presentation data memory device 202.

The display device 101 of the speaker's equipment 100 displays the presentation data to be transmitted to the audience, to the user of the speaker's equipment 100, that is the speaker. The presentation data storage device 102 is storing many presentation data prepared by the speaker.

The audience's equipment information acquisition device 104 of the speaker's equipment 100 checks whether the audience's equipment information is stored in the audience's equipment information storage device 103 or not upon receiving a command for sending the audience's equipment information from the presentation data for transmission producing device 105, and gives the audience's equipment information to the presentation data for transmission producing device 105 if the audience's equipment information is stored there. On the contrary, if the audience's equipment information is not stored there, the audience's equipment information acquisition device 104 outputs an audience's equipment information acquisition request to the audience's equipment information output device 203 of the audience's equipment 200 through the network 300. When the audience's equipment information is acquired through the network 300, the audience's equipment information acquisition device 104 stores it into the audience's equipment information storage device 103 while also giving it to the presentation data for transmission producing device 105.

The presentation data for transmission producing device 105 of the speaker's equipment 100 receives the audience's equipment information from the audience's equipment information acquisition device 104 upon receiving a command for transmitting the presentation data to the participants (audience) of the electronic conference from the speaker. This presentation data transmission command is entered into the presentation data for transmission producing device 105 when the speaker operates the input device of the speaker's equipment 100, for example. On the other hand, the presentation data for transmission producing device 105 acquires the presentation data specified by the speaker from the presentation data storage device 102, and produces the presentation data for transmission from the acquired presentation data according to the audience's equipment information.

The transmission device 106 receives the presentation data for transmission from the presentation data for transmission producing device 105, and transmits it to the reception device 204 of the audience's equipment 200 through the network 300.

The display device 201 of the audience's equipment 200 displays the presentation data transmitted from the speaker to users of the audience's equipment 200, that is the audience. The presentation data memory device 202 is a device for temporarily storing many presentation data transmitted from the speaker. The reception device 204 receives the presentation data transmitted from the speaker through the network 300 and stores these data into the presentation data memory device 202.

The audience's equipment information output device 203 of the audience's equipment 200 collects the audience's equipment information within the audience's equipment 200 and transmits it upon receiving the audience's equipment information acquisition request from the speaker's equipment 100 through the network 300. The audience's equipment information is the information regarding the display capability of the audience's equipment 200 as described above.

The audience's equipment information output device 203 collects the audience's equipment information by checking file formats, fonts, colors, etc., that are displayable at the audience's equipment 200. The collecting of the audience's equipment information may be carried out at a timing of receiving the audience's equipment information acquisition request, or it may be carried out in advance such that the collected audience's equipment information is stored in the memory device of the audience's equipment 200. In the latter case, the audience's equipment information output device 203 will outputs the already stored audience's equipment information upon receiving the audience's equipment information acquisition request.

Note that it is also possible to provide the audience's equipment information storage device 103, the presentation data for transmission producing device 105 and the transmission device 106 at the audience's equipment 200 as well, such that it becomes possible to operate a single equipment as both the speaker's equipment and the audience's equipment.

Next, the operation of the electronic conference system according to the first embodiment of the present invention will be described. FIG. 2 to FIG. 4 show an exemplary processing procedure for the presentation data distribution method in the electronic conference system of the first embodiment.

In FIG. 2, when the transmission of the presentation data is requested from the speaker (step S201), the audience's equipment information acquisition device 104 checks whether the audience's equipment information is stored in the audience's equipment information storage device 103 or not. If the audience's equipment information is not stored there (step S202 NO), the audience's equipment information acquisition device 104 transmits the audience's equipment information acquisition request to the audience's equipment 200 through the network 300 (step S203). Then, the audience's equipment information acquisition device 104 stores the audience's equipment information returned from the audience's equipment 200 in response to that request into the audience's equipment information storage device 103, and sends an audience's equipment information acquisition notice to the presentation data for transmission producing device 105 (step S204). On the other hand, if the audience's equipment information is already stored (step S202 YES), the processing proceeds to the step S204 directly.

In FIG. 3, when the audience's equipment information acquisition notice is received from the audience's equipment information acquisition device 104 (step S301), the presentation data for transmission producing device 105 acquires the audience's equipment information from the audience's equipment information acquisition device 104 (step S302), and then acquires the presentation data specified by the speaker from the presentation data storage device 103 (step S303). The presentation data for transmission producing device 105 produces the presentation data for transmission according to the audience's equipment information (step S304). Then, the transmission device 106 transmits the produced presentation data for transmission to the audience's equipment 200 on the network 300 (step S305).

In FIG. 4, when the presentation data are received at the reception device 204 of the audience's equipment 200 through the network 300 (step S401), the presentation data are stored into the presentation data memory device 202 (step S402), and displayed at the display device 201 (step S403).

Next, the procedure for acquiring the audience's equipment information at the step S203 described above will be described. The audience's equipment information acquisition device 104 transmits the audience's equipment information acquisition request to the audience's equipment 200. Upon receiving this request, the audience's equipment 200 transmits the audience's equipment information to the speaker's equipment 100. When the audience's equipment information is acquired at the speaker's equipment 100, it is stored into the audience's equipment information storage device 103 and the audience's equipment information acquisition notice is sent to the presentation data for transmission producing device 105.

Next, the procedure for producing the presentation data for transmission at the step S304 described above will be described for four exemplary cases.

1. FIRST EXAMPLE

Figure 5A:
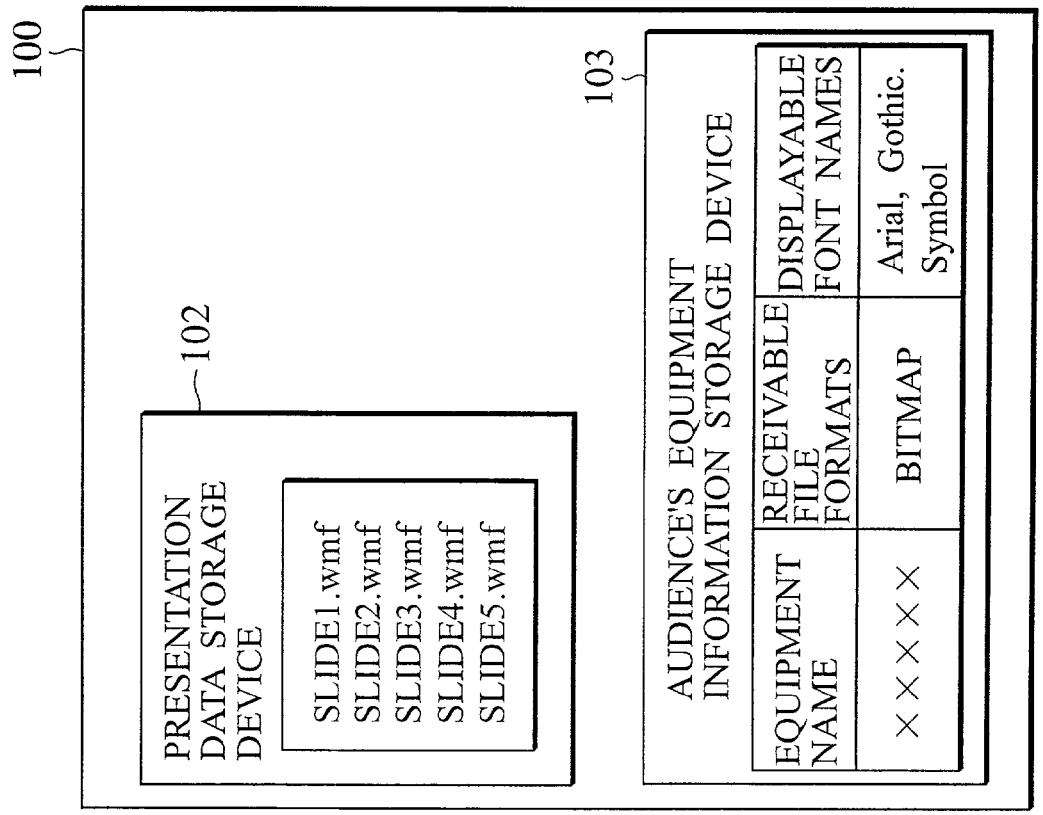

First, FIG. 5A shows an exemplary case where information on a data format displayable by the audience's equipment 200, which is given by a receivable file format and displayable fonts here, as the audience's equipment information. The data format can be specified by the file format, fonts and colors used in the data, etc.

Upon receiving the audience's equipment information acquisition notice, the presentation data for transmission producing device 105 compares a file "slide1.wmf" in a meta-file format stored in the presentation data storage device 102 with a "bitmap" that is stored in the audience's equipment information storage device 103 as the file format displayable by the audience's equipment. Since they are different, the presentation data for transmission producing device 105 produces the presentation data for transmission by converting the presentation data into the bitmap format that is displayable at the transmission target.

In the conventional presentation data transmission between equipments having different OSs, for example, the presentation data on the transmitting side are transmitted as they are so that there has been a problem that the presentation data cannot be displayed at the audience's equipment when the presentation data are given in the file format specific to the OS of the transmitting side equipment. Also, even between the same OSs, the similar problem may arise depending on types of fonts provided at each side. The present invention can resolve this kind of problem.

2. SECOND EXAMPLE

Next, FIG. 5B shows an exemplary case where a data size receivable by the audience's equipment 200 as the audience's equipment information.

Upon receiving the audience's equipment information acquisition notice, the presentation data for transmission producing device 105 compares a total size of data to be transmitted that are stored in the presentation data storage device 102 with a maximum data size stored in the audience's equipment information storage device 103. When the maximum data size of the audience's equipment 200 is smaller than the total size of the transmission data, the presentation data for transmission producing device 105 produces the presentation data for transmission by converting the presentation data from the bitmap format into the JPEG format with compressed images. In this way, the necessary presentation data can be transmitted even when the audience's equipment 200 has only a small capacity.

3. THIRD EXAMPLE

Figure 5D:
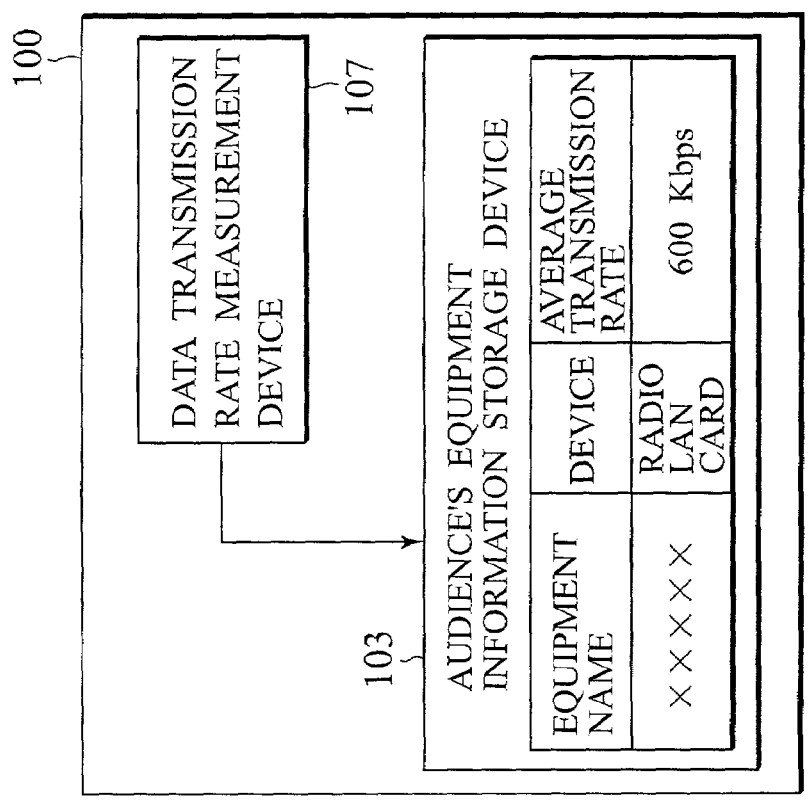
Figure 5C:
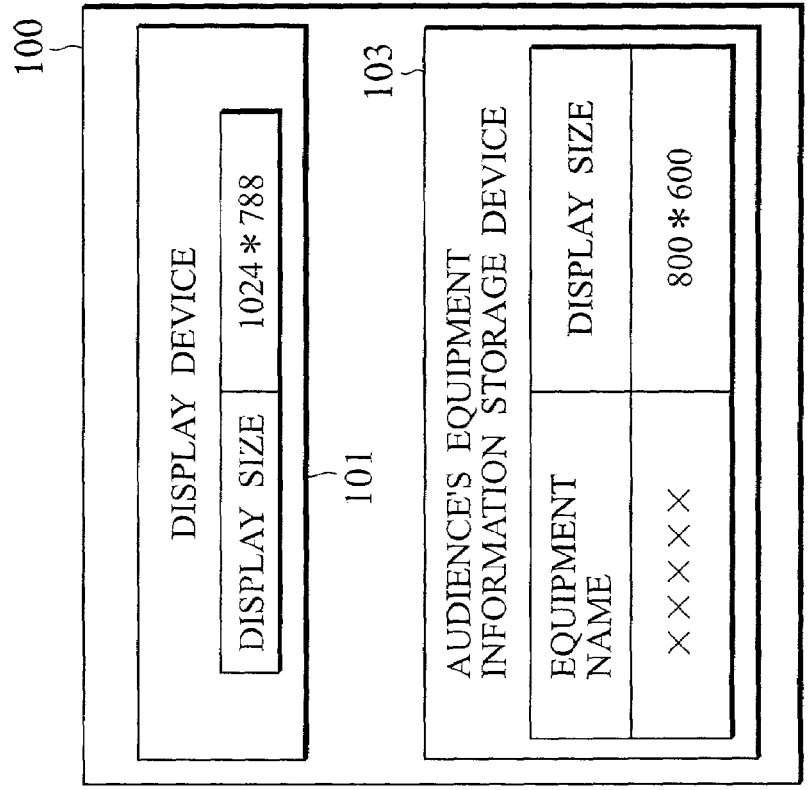

Next, FIG. 5C shows an exemplary case where a display screen size of the display device 201 of the audience's equipment 200 as the audience's equipment information.

Upon receiving the audience's equipment information acquisition notice, the presentation data for transmission producing device 105 compares a display screen size of the display device 101 of the speaker's equipment 100 with a display screen size of the display device 201 of the audience's equipment 200 stored in the audience's equipment information storage device 103, and enlarges or contracts the display screen size in accordance with that of the audience's equipment 200. In this way, the presentation data that are optimal for the display purpose can be transmitted and displayed even when the audience's equipment 200 is an equipment in which the change of the equipment 200 is an equipment in which the change of the display screen size is difficult such as a network projector.

4. FOURTH EXAMPLE

Next, FIG. 5D shows an exemplary case where a transmission rate to be used with respect to the audience's equipment 200 as the audience's equipment information. The audience's equipment information acquisition device 104 has a data transmission rate measurement device 107 provided therein, which measures the data transmission rate used with respect to the audience's equipment 200 at a time of the initial presentation data transmission. Then, an average transmission rate is stored into the audience's equipment information storage device 103. It is also possible to acquire a network device to be used by the audience's equipment 200 and its average transmission rate in advance.

Upon receiving the audience's equipment information acquisition notice, the presentation data for transmission producing device 105 acquires the data transmission rate from the audience's equipment information storage device 103, and transmits the presentation data as they are if the actual transmission rate is lower than the data transmission rate of the audience's equipment 200, or transmits the presentation data after compressing them or using a higher compression rate in the case where the presentation data are already compressed otherwise. In this way, the presentation data that can be displayed more clearly can be transmitted on a fast network or the presentation data can be transmitted efficiently on a slow network, even when various devices such as those for the wired network and the radio network are used as the network device.

Referring now to FIG. 6 and FIG. 7, the second the present invention will be described in detail.

FIG. 6 shows an exemplary configuration of the electronic conference system according to the second embodiment of the present invention. In this second embodiment, the transmission unit 106 of the first embodiment described above is replaced by a multicasting device 401 with a transmission target list memory unit 402 provided therein. The other elements of the speaker's equipment 400 and the audience's equipment 200 shown in FIG. 6 are the same as those shown in FIG. 1.

Note that FIG. 6 shows only one audience's equipment 200 for the sake of simplicity but in practice a plurality of audience's equipments 200 to be utilized by different members of the audience may be connected to the network 300.

The multicasting device 401 of the speaker's equipment 400 produces a list of the audience's equipments to which the same presentation data for transmission should be transmitted, according to the audience's equipment information acquired by the audience's equipment information acquisition device 104. This transmission target list is then registered in the transmission target list memory unit 402 provided in the multicasting device 401, for example. The multicasting device 401 multicasts the presentation data for transmission to the audience's equipments 200 according to the list registered in the transmission target list memory unit 402.

Next, the operation of the electronic conference system according to the second embodiment of the present invention will be described.

When the audience's equipments and the presentation data to be transmitted to the audience's equipments are specified from the speaker, the audience's equipment information acquisition device 104 acquires the audience's equipment information for all the audience's equipments specified by the speaker and stores it into the audience's equipment information storage device 103, similarly as in the first embodiment described above.

FIG. 7 shows an exemplary case where file formats displayable by the audience's equipments 200 are acquired as the audience's equipment information. In this case, the presentation data for transmission producing device 105 converts the presentation data in a meta-file format stored in the presentation data storage device 102 into the bitmap format and the JPEG format, for example.

Then, the multicasting device 401 produces a list of transmission targets for the presentation data for transmission in each format, and registers them into the transmission target list memory unit 402. The multicasting device 401 transmits the presentation data in the bitmap format to the audience's equipments 200 that are capable of displaying the bitmap format and the presentation data in the JPEG format to the audience's equipments 200 that are capable of displaying the JPEG format, according to the transmission target list registered in the transmission target list memory unit 402. The operation of the audience's equipment 200 that received the presentation data is the same as the audience's equipment 200 of the first embodiment described above.

As described, according to the electronic conference system according to the second embodiment of the present invention, the presentation data in a format displayable by the audience's equipment 200 are produced and distributed so that the presentation data can be displayed correctly at the audience's equipment 200, even when the data format of the presentation data stored in the speaker's equipment 400 and the data format displayable by the audience's equipment 200 are different, similarly as in the first embodiment described above.

In addition, according to this second embodiment, it is possible to distribute the presentation data for transmission with respect to the audience's equipments 200 efficiently in the case of using a network capable of carrying out the high speed multicast such as a radio network.

Referring now to FIG. 8 to FIG. 9C, the third embodiment of an electronic conference system according to the present invention will be described in detail.

The first and second embodiments described above are directed to the case where the speaker's equipment mainly produced the data that are displayable by the audience's equipment. In contrast, this third embodiment is directed to the case where the data that are displayable by the audience's equipment are mainly produced by the audience's equipment.

FIG. 8 shows an exemplary configuration of the electronic conference system according to the second embodiment of the present invention. In FIG. 8, the electronic conference system comprises an information processing equipment (speaker's equipment) 500, an information processing equipment (audience's equipment) 600, and a network 300 connecting the information processing equipment 500 and the information processing equipment 600.

Note that FIG. 8 shows only one audience's equipment 600 for the sake of simplicity but in practice a plurality of audience's equipments 600 to be utilized by different members of the audience may be connected to the network 300.

The speaker's equipment 500 has a display device 501, a presentation data storage device 502 for storing the presentation data prepared by the speaker, a spare data producing device 503 for producing spare data to be transmitted to the audience's equipment 600 by converting a transmitted to the audience's equipment 600 by converting a data format of a part or a whole of the presentation data to be transmitted from the presentation data storage device 502 to the audience's equipment 600 into another format, and a transmission device 504 for receiving data to be actually transmitted to the audience's equipment 600 from the presentation data storage device 502 and the spare data producing device 503 and transmitting them to the audience's equipment 600.

On the other hand, the audience's equipment 600 has a reception device 604 for receiving the data transmitted from the speaker's equipment 500, a presentation data memory device 603 for temporarily storing the data received by the reception device 604, a display data producing device 602 for producing data displayable by the audience's equipment 600 from the data stored in the presentation data memory device 603, and a display device 601.

Next, the operation of the electronic conference system according to the third embodiment of the present invention will be described.

FIG. 9A shows a data structure of the presentation data stored in the presentation data storage device 502 of the speaker's equipment 500. In FIG. 9A, the presentation data prepared by the speaker comprises character information and image information, these informations are stored in an order of drawing. A numeral indicated on a left end of each information indicates the order of drawing. Also, each character information is attached with a font information for that character, a position information indicating a position for drawing that character, and an attribute information indicating a color or the like. On the other hand, the image information is attached with the image data and a position information indicating a position for drawing that image.

The spare data producing device 503 reads out the presentation data stored in the presentation data storage device 502 and, for each character information in the presentation data, produces an image information obtained by actually drawing that character information at the speaker's equipment 500 (which will be referred to as "spare image information" hereafter) as the spare data, and then stores the spare image information along with the order of drawing and the position information of the original character information as shown in FIG. 9B.

The transmission device 504 transmits the presentation data of FIG. 9A and the spare data of FIG. 9B to the audience's equipment 600.

The reception device 604 of the audience's equipment 600 receives the presentation data and the spare data from the speaker's equipment 500, and stores them into the presentation data memory device 603. The display data producing device 602 reads out the presentation data and the spare data, checks whether there is any character information contained in the presentation data for which the font is not available or not, and if there is, produces the display data in which the spare image information is substituted into the character information. FIG. 9C shows an exemplary display data in which the fonts for the second and fourth character informations in the order of drawing are not available.

The display device 601 of the audience's equipment 600 displays the display data produced by the display data producing device 602.

In this way, the presentation data can be displayed correctly at the audience's equipment even in the case where the fonts available at the audience's equipment are different from the fonts available at the speaker's equipment.

As described, according to the present invention, it is possible to display the presentation data correctly even at the audience's equipments which have display capabilities different from that of the speaker's equipment.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the speaker's equipment or the audience's equipment of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An electronic conference system, comprising:
a first information processing equipment to be used by a speaker of a presentation to be presented to audience;
a second information processing equipment to be used by the audience; and
a network connecting the first information processing equipment and the second information processing equipment;
the first information processing equipment having:
a storage device configured to store presentation data prepared by the speaker;
an information acquisition device configured to acquire information regarding the second information processing equipment from the second information processing equipment;
a producing device configured to produce presentation data for transmission suitable for the second information processing equipment, by applying a prescribed processing to the presentation data stored in the storage device, according to the information regarding the second information processing equipment acquired by the information acquisition device; and
a transmission device configured to transmit the presentation data for transmission produced by the producing device, to the second information processing equipment; and
the second information processing equipment having:
an information output device configured to output the information regarding the second information processing equipment in response to a request from the first information processing equipment;
a reception device configured to receive the presentation data for transmission transmitted from the first information processing equipment; and
a display device configured to display the presentation data for transmission received by the reception device.

2. The electronic conference system of claim 1, wherein the information acquisition device acquires a data format displayable by the second information processing equipment as the information regarding the second information processing equipment, and
the producing device produces the presentation data for transmission by converting an original data format of the presentation data stored in the storage device into the data format displayable by the second information processing equipment as acquired by the information acquisition device.

3. The electronic conference system of claim 1, wherein the information acquisition device acquires a data size receivable by the second information processing equipment as the information regarding the second information processing equipment, and
the producing device produces the presentation data for transmission by converting the presentation data stored in the storage device such that a resulting data size of converted presentation data matches the data size receivable by the second information processing equipment as acquired by the information acquisition device.

4. The electronic conference system of claim 1, wherein the information acquisition device acquires a display screen size of the second information processing equipment as the information regarding the second information processing equipment, and
the producing device produces the presentation data for transmission by converting the presentation data stored in the storage device such that a resulting display screen size of converted presentation data matches the display screen size of the second information processing equipment as acquired by the information acquisition device.

5. The electronic conference system of claim 1, wherein the information acquisition device acquires a desired data transmission rate of the second information processing equipment as the information regarding the second information processing equipment, and
the producing device produces the presentation data for transmission by compressing the presentation data stored in the storage device according to an actual data transmission rate between the first information processing equipment and the second information processing equipment and the desired data transmission rate of the second information processing equipment as acquired by the information acquisition device.

6. A speaker's information processing equipment to be used by a speaker of a presentation to be presented to audience using an audience's information processing equipment connected to the speaker's information processing equipment through a network, the speaker's information processing equipment comprising:
- a storage device configured to store presentation data prepared by the speaker;
- an information acquisition device configured to acquire information regarding the audience's information processing equipment from the audience's information processing equipment;
- a producing device configured to produce presentation data for transmission suitable for the audience's information processing equipment, by applying a prescribed processing to the presentation data stored in the storage device, according to the information regarding the audience's information processing equipment acquired by the information acquisition device; and
- a transmission device configured to transmit the presentation data for transmission produced by the producing device, to the audience's information processing equipment.

7. A computer program product stored in a computer readable medium for causing a computer to function as a speaker's information processing equipment to be used by a speaker of a presentation to be presented to audience using an audience's information processing equipment connected to the speaker's information processing equipment through a network, the computer program product comprising:
- a first computer program code for causing the computer to store presentation data prepared by the speaker in a storage device;
- a second computer program code for causing the computer to acquire information regarding the audience's information processing equipment from the audience's information processing equipment;
- a third computer program code for causing the computer to produce presentation data for transmission suitable for the audience's information processing equipment, by applying a prescribed processing to the presentation data stored in the storage device, according to the information regarding the audience's information processing equipment acquired by the second computer program code; and
- a fourth computer program code for causing the computer to transmit the presentation data for transmission produced by the third computer program code, to the audience's information processing equipment.

8. An electronic conference system, comprising:
- a first information processing equipment to be used by a speaker of a presentation to be presented to audience;
- a plurality of second information processing equipments to be used by the audience; and
- a network connecting the first information processing equipment and the second information processing equipments;
- the first information processing equipment having:
  - a storage device configured to store presentation data prepared by the speaker;
  - an information acquisition device configured to acquire information regarding each second information processing equipment from each second information processing equipment;
  - a producing device configured to produce a plurality of presentation data for transmission suitable for the second information processing equipments respectively, by applying a prescribed processing to the presentation data stored in the storage device, according to the information regarding each second information processing equipment acquired by the information acquisition device; and
  - a multicasting device configured to produce a transmission target list indicating each group of those second information processing equipments to which identical presentation data for transmission are to be transmitted, and multicast the presentation data for transmission to the second information processing equipments according to the transmission target list; and
- each second information processing equipment having:
  - an information output device configured to output the information regarding each second information processing equipment in response to a request from the first information processing equipment;
  - a reception device configured to receive the presentation data for transmission transmitted from the first information processing equipment; and
  - a display device configured to display the presentation data for transmission received by the reception device.

9. The electronic conference system of claim 8, wherein the information acquisition device acquires a data format displayable by each second information processing equipment as the information regarding each second information processing equipment, and
the producing device produces the presentation data for transmission by converting an original data format of the presentation data stored in the storage device into the data format displayable by each second information processing equipment as acquired by the information acquisition device.

10. The electronic conference system of claim 8, wherein the information acquisition device acquires a data size receivable by each second information processing equipment as the information regarding each second information processing equipment, and
the producing device produces the presentation data for transmission by converting the presentation data stored in the storage device such that a resulting data size of converted presentation data matches the data size receivable by each second information processing equipment as acquired by the information acquisition device.

11. The electronic conference system of claim 8, wherein the information acquisition device acquires a display screen size of each second information processing equipment as the information regarding each second information processing equipment, and
the producing device produces the presentation data for transmission by converting the presentation data stored in the storage device such that a resulting display screen size of converted presentation data matches the display screen size of each second information processing equipment as acquired by the information acquisition device.

12. The electronic conference system of claim 8, wherein the information acquisition device acquires a desired data transmission rate of each second information processing equipment as the information regarding each second information processing equipment, and
the producing device produces the presentation data for transmission by compressing the presentation data stored in the storage device according to an actual data transmission rate between the first information processing equipment and each second information processing equipment and the desired data transmission rate of each second information processing equipment as acquired by the information acquisition device.

13. A speaker's information processing equipment to be used by a speaker of a presentation to be presented to audience using a plurality of audience's information processing equipments connected to the speaker's information processing equipment through a network, the speaker's information processing equipment comprising:
- a storage device configured to store presentation data prepared by the speaker;
- an information acquisition device configured to acquire information regarding each audience's information processing equipment from each audience's information processing equipment;
- a producing device configured to produce a plurality of presentation data for transmission suitable for the audience's information processing equipments respectively, by applying a prescribed processing to the presentation data stored in the storage device, according to the information regarding each audience's information processing equipment acquired by the information acquisition device; and
- a multicasting device configured to produce a transmission target list indicating each group of those audience's information processing equipments to which identical presentation data for transmission are to be transmitted, and multicast the presentation data for transmission to the audience's information processing equipments according to the transmission target list.

14. A computer program product stored in a computer readable medium for causing a computer to function as a speaker's information processing equipment to be used by a speaker of a presentation to be presented to audience using a plurality of audience's information processing equipments connected to the speaker's information processing equipment through a network, the computer program product comprising:
- a first computer program code for causing the computer to store presentation data prepared by the speaker in a storage device;
- a second computer program code for causing the computer to acquire information regarding each audience's information processing equipment from each audience's information processing equipment;
- a third computer program code for causing the computer to produce a plurality of presentation data for transmission suitable for the audience's information processing equipments respectively, by applying a prescribed processing to the presentation data stored in the storage device, according to the information regarding each audience's information processing equipment acquired by the second computer program code; and
- a fourth computer program code for causing the computer to produce a transmission target list indicating each group of those audience's information processing equipments to which identical presentation data for transmission are to be transmitted, and multicast the presentation data for transmission to the audience's information processing equipments according to the transmission target list.

15. An electronic conference system, comprising:
- a first information processing equipment to be used by a speaker of a presentation to be presented to audience;
- a second information processing equipment to be used by the audience; and
- a network connecting the first information processing equipment and the second information processing equipment;

the first information processing equipment having:
- a storage device configured to store presentation data prepared by the speaker;
- a spare data producing device configured to produce spare data corresponding to at least a part of the presentation data stored in the storage device by converting an original data format of the at least a part of the presentation data into a different data format; and
- a transmission device configured to transmit the spare data produced by the spare data producing device and the presentation data containing original data corresponding to the spare data, to the second information processing equipment; and the second information processing equipment having:
- a reception device configured to receive the spare data and the presentation data transmitted from the first information processing equipment;
- a display data producing device configured to produce display data in a data format displayable by the second information processing equipment from the spare data and the presentation data received by the reception device, by using one of the spare data and the original data that are displayable by the second information processing equipment; and
- a display device configured to display the display data produced by the display data producing device.

16. The electronic conference system of claim 15, wherein the spare data producing device produces the spare data which are image data obtained from the original data which are character data.

17. An audience's information processing equipment to be used by audience of a presentation to be presented by a speaker using a speaker's information processing equipment connected to the audience's information processing equipment through a network, the audience's information processing equipment comprising:
- a reception device configured to receive spare data corresponding to at least a part of presentation data prepared by the speaker and the presentation data containing original data corresponding to the spare data, which are transmitted from the speaker's information processing equipment, the spare data being obtained by converting an original data format of the at least a part of the presentation data into a different data format;
- a display data producing device configured to produce display data in a data format displayable by the audience's information processing equipment from the spare data and the presentation data received by the reception device, by using one of the spare data and the original data that are displayable by the audience's information processing equipment; and
- a display device configured to display the display data produced by the display data producing device.

18. A computer program product stored in a computer readable medium for causing a computer to function as an audience's information processing equipment to be used by audience of a presentation to be presented by a speaker using a speaker's information processing equipment connected to the audience's information processing equipment through a network, the computer program product comprising:
- a first computer program code for causing the computer to receive spare data corresponding to at least a part of presentation data prepared by the speaker and the presentation data containing original data corresponding to the spare data, which are transmitted from the speaker's information processing equipment, the spare data being obtained by converting an original data format of the at least a part of the presentation data into a different data format;

a second computer program code for causing the computer to produce display data in a data format displayable by the audience's information processing equipment from the spare data and the presentation data received by the first computer program code, by using one of the spare data and the original data that are displayable by the audience's information processing equipment; and a third computer program code for causing the computer to display the display data produced by the second computer program code.

* * * * *